US010245760B2

(12) United States Patent
Halford

(10) Patent No.: US 10,245,760 B2
(45) Date of Patent: Apr. 2, 2019

(54) MOULD TOOL HEAT MANAGEMENT

(71) Applicant: SURFACE GENERATION LIMITED, Lyndon, Oakham Rutland (GB)

(72) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 330 days.

(21) Appl. No.: 14/772,057

(22) PCT Filed: Mar. 4, 2014

(86) PCT No.: PCT/GB2014/050633
§ 371 (c)(1),
(2) Date: Sep. 1, 2015

(87) PCT Pub. No.: WO2014/135858
PCT Pub. Date: Sep. 12, 2014

(65) Prior Publication Data
US 2016/0016335 A1     Jan. 21, 2016

(30) Foreign Application Priority Data
Mar. 4, 2013 (GB) .................... 1303844.3

(51) Int. Cl.
B29C 33/04     (2006.01)
(52) U.S. Cl.
CPC ........ *B29C 33/04* (2013.01); *B29C 2033/042* (2013.01)

(58) Field of Classification Search
CPC .... B29C 33/0083; B29C 33/04; B29C 33/042
See application file for complete search history.

(56) References Cited

U.S. PATENT DOCUMENTS 6,000,831 A * 12/1999 Triplett ............... B29C 33/0083
264/328.1
2007/0075457 A1   4/2007 Eichlseder
2008/0254162 A1   10/2008 Imura et al.
2012/0315351 A1   12/2012 Oh

FOREIGN PATENT DOCUMENTS

| | | | |
|---|---|---|---|
| DE | 19854057 A1 | 5/2000 | |
| EP | 1110692 A1 | 6/2001 | |
| EP | 2527125 A2 | 11/2012 | |
| GB | 2007578 A | 5/1979 | |
| JP | 60253514 A * | 12/1985 | ......... B29C 33/0083 |
| WO | 2010103471 A2 | 9/2010 | |
| WO | 2013021195 A2 | 2/2013 | |

OTHER PUBLICATIONS

Patents Act 1977: Search Report under Section 17(5) dated Sep. 4, 2013 in UK application GB1303844.3.
International Search Report in PCT/GB2014/050633 dated Jun. 18, 2014.

* cited by examiner

*Primary Examiner* — Ryan Ochylski
(74) *Attorney, Agent, or Firm* — Young Law Firm, P.C.

(57) ABSTRACT

A multi-layered tool for forming a working having an active thermal layer disposed between two layers of the tool which is independently controllable to add or subtract thermal energy to or from the tool.

20 Claims, 6 Drawing Sheets

Fig. 3

MOULD TOOL HEAT MANAGEMENT

BACKGROUND

The present invention is concerned with the management of temperature of a mould tool. More specifically the present invention is concerned with management of the temperature of a mould tool which utilises fluid heating and cooling.

BRIEF DESCRIPTION OF THE DRAWINGS

An example tool for forming a workpiece in accordance with the present invention will now be described with reference to the appended drawings in which:

FIG. 2b is a temperature profile of a the mould tool assembly of FIG. 2a;

FIG. 3 is a schematic view of a second embodiment of a mould tool assembly in accordance with the present invention;

DETAILED DESCRIPTION

Fluid heating of layered mould tools is known, in particular from the applicant's earlier application published as WO 2013/021195. In this document, fluid-based heating of the back of the mould tool face in order to control the curing properties of the workpiece is discussed, whilst the control circuitry and delicate componentry of the mould tool is protected from excessive temperatures through the tool's layered structure.

Heat management can be characterized in the three axes of the mould tool: X, Y and Z, (X and Y in the lateral direction, and Z in the vertical direction). Mould tools may be designed so that the predominant direction for heat transfer is towards the mould face (i.e. +Z), to mitigate heat losses in the −Z direction. However, if the mould tool is employed on a long duration temperature cycle, the inevitable conduction of heat throughout the tool is unavoidable and problematic.

Such tools also need to be thermally agile-that is to be able to be heated and cooled quickly to provide the necessary control. Therefore a light tool with low thermal mass is desirable. However, given the necessary mechanical properties of a mould tool, e.g. stiffness to support loading without deflection, strength and hardness to withstand repeated loading etc. it is desirable to make the tools bulky, and therefore thermal energy management within a mould tool is a challenge. Fluid channels and electrical components also need to be provided, making the tools more bulky. Providing a stiff, strong mould tool with the necessary functionality and which is thermally agile is desirable.

Zone control of tool temperature is also known, in particular from the applicant's earlier application published as WO 2011/048365. In this document, heating and cooling means are independently associated with each tool "pixel" —which may be defined as described below.

In one embodiment of WO 2011/048365 each heated/cooled tool pixel has an independent in-line heater/cooler associated therewith, comprising an internal channel in each tool pixel below the tool surface through which a heating/cooling fluid is passed. The pixels are arranged to tessellate to form the tool surface at their upper surface.

In WO 2013/021195, a first layer provides the mould tool face, and is heated by impingement of an in-line air heater. A second layer sits beneath the first layer, and provides exhaust channels for the used fluid. A third layer sits beneath the second layer and holds the heater unit, with the control electronics. Each in-line air heater has a tube which extends from the heater in the third layer, through the second (exhaust) layer to the first layer. As such, fluid is passed through the heater, passed through the second layer (in the sealed tube) and is impinged on the back face of the first layer. The used fluid then escapes downwardly through the second (exhaust) layer.

Figure 1:
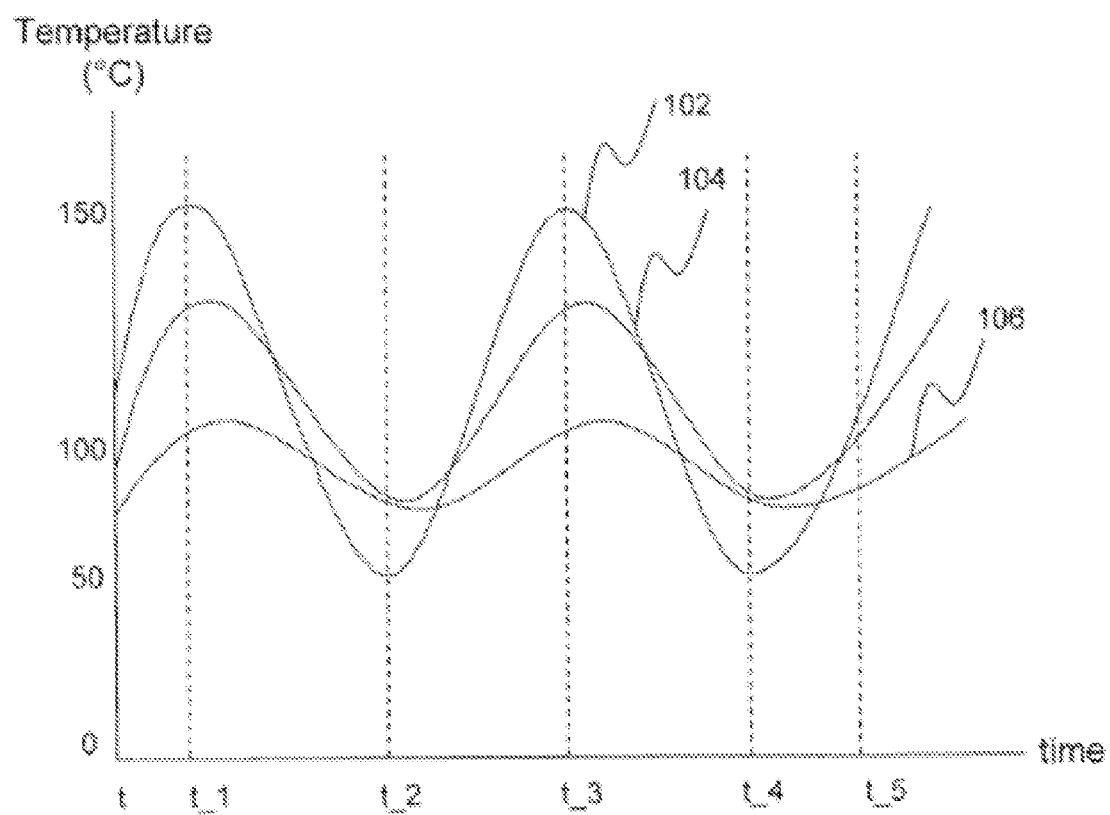
FIG. 1 is a temperature profile of a known layered mould tool.

FIG. 1 is a temperature profile of a known layered mould tool (such as that disclosed in WO 2013/021195). The profile shows a period of operation starting at time t, with two temperature cycles completed by time $t\_5$. The first layer temperature is indicated by line 102. The first layer is repeatedly heated to 150° C. (at times $t\_1$ and $t\_3$) and cooled to 50° C. (at times $t\_2$ and $t\_4$) by turning the heater off (and impinging ambient air on the back of the tool) during the forming of a part in a sequence of heating phases and cooling phases. The temperature profile of the exhaust layer 104, positioned directly under the first layer undergoes a similar heating and cooling cycle by conduction from the first layer, and partially from the in-line air tubes, and its temperature profile lags behind the first layer with reduced magnitudes of temperature. The temperature profile of the third layer 106 of the tool is even lower in magnitude, and again lags behind.

It will be noted that during the heating phases of the tool, due to the delta in temperature between the first and second layers, some thermal energy flows into the second and third layers by conduction. Similarly, during cooling, thermal energy flows back to the first layer. Both effects are undesirable as they reduce the effectiveness of heating and cooling of the tool, and make it less agile. Cycle times are adversely affected as a result.

Furthermore, the third layer usually has a temperature "ceiling" above which the delicate electronics stored therein may be damaged. This ceiling is at risk of breach if the mould temperatures are high.

One solution proposed in the prior art is to provide insulating material of e.g. mica between the layers. In reality, this has a negative effect over many cycles, as the insulating material heats up and acts to reduce the agility of the tool.

It is an aim of the present invention is to increase the thermal agility of a mould tool to allow greater control of the mould face and reduce cycle times for producing parts.

According to a first aspect of the invention there is provided a mould tool assembly comprising:
- a mould layer comprising a mould face and a temperature control surface opposite the mould face;
- a temperature control assembly comprising a fluid conduit arranged to direct heating and/or cooling fluid to the temperature control face;
- a further layer supporting the mould layer in use;
- an active thermal layer disposed between the mould layer and further layer, which active thermal layer comprises a fluid chamber configured to be heated and/or cooled independently of the mould layer.

Advantageously, the active thermal layer allows greater control of the mould tool to effect temperature variation of the tool face of a mould tool according to specific regimes relating to the component to be formed. The active thermal layer allows thermal decoupling of the layers. During cooling, the active thermal layer can be set at a lower temperature, to help "pull" the overall mould tool temperature down. Conversely, during heating, the active thermal layer can be set at a higher required temperature, to help "pull" the overall mould tool temperature up. In another temperature profile, the active thermal layer can be used to set certain parts of the mould tool to particular temperatures, in a "pre-heat" or "pre-cool" fashion.

An intermediate layer may be provided, the intermediate layer positioned between the mould layer and the further layer. As such, the active thermal layer may be positioned between the intermediate layer and the further layer, or between the intermediate layer and the mould layer.

Preferably the assembly comprises a second temperature control assembly configured to selectively heat and/or cool the active thermal layer. The second temperature control assembly may comprise a fluid conduit for connection to a pressurised source of fluid, and a heater configured to be selectively switched to provide a heating flow or cooling flow of the fluid.

This arrangement allows delivery of fluid to the active thermal layer to provide temperature control of the active thermal layer, the exhaust port allowing fluid pressure to be managed. The use of fluid to supply the active thermal layer enables the requisite repeatability of the extreme temperature cycles.

By supplying the active thermal layer with an independent heater assembly to the mould tool first layer, the two layers may be set to different thermal regimes. Furthermore, a different fluid may be used within the second heater assembly compared to the first heater assembly, for example nitrogen, which provides alternate thermic properties.

The active thermal layer may define a further temperature control surface on a side of the fluid chamber furthest from the further layer. The fluid outlet of the fluid conduit of the second temperature control assembly is directed towards the second temperature control surface. This arrangement allows maximisation of the conduction of the thermal energy according to the demands of the tool surface, and minimisation of the conduction of the thermal energy towards the third layer.

The active thermal layer may define a further temperature control surface in a region of one or more of the walls of the fluid chamber. The arrangement allows for localised increases in the surface area of the walls of the fluid chamber to provide varying thermal energy paths as is necessary.

Preferably the fluid chamber comprises a plurality of interconnected chambers. This arrangement, which may be dendritic in form, allows support for load paths whilst facilitating intelligent routing to the flow for maximising heating and cooling.

The assembly defines a Z axis generally normal to the mould layer, in which the second temperature control assembly may be arranged to direct flow normal to the Z axis. In this case, the second temperature control assembly may be at least partly positioned exterior the tool. This arrangement allows the active thermal layer to be incorporated into existing "layered" tool designs, without the need to re-organise the arrangement of the first heater assembly.

Alternatively, the second temperature control assembly inlet may be positioned within the further layer. Advantageously this arrangement prevents the need for additional scaffolding to support the second heater assembly components external to the mould tool.

The fluid chamber of the active layer has a first wall adjacent the mould layer, and a second wall adjacent the further layer and at least a region of one of said first or second walls may comprise features increasing the surface area of the first or second wall over the other of the first or second wall. This allows the tool to be tailored specifically to increase heat transfer to and from the mould layer, according to the demands of the workpiece. For example, if the tool is to undergo a long duration heat cycle, the main design driver may be to prevent heating of the sensitive utilities. As such, a greater surface area on the first wall adjacent the mould layer encourages more heat transfer towards the mould layer and less towards the utilities. Alternatively, if the tool is to undergo a very short duration heat cycle, the main design driver may be to effect changes in mould surface temperature as quickly as possible. As such, by increasing the surface area of both walls of the active layer, the active layer can have a greater overall effect on the mould tool temperature.

The tool may further comprise a sensor arranged to detect a temperature of the active thermal layer and/or a sensor arranged to detect ambient temperature exterior of the tool.

A control system may be provided and configured to maintain the temperature of the active thermal layer at a predetermined set point.

Preferably the first and third layers may be configured such that flow of fluid from the first fluid chamber into the further layer is prohibited. This prevents heat passing to the further layer by convection.

The intermediate layer may be an exhaust flow layer for the mould layer heating flow. In this case a flow conduit may be provided from an outlet of the exhaust flow layer to the active thermal layer. Use of pre-heated fluid can save energy.

The flow conduit may be configured to provide flow past the periphery of the mould layer to reduce the temperature difference between the mould layer and the local environment.

The further layer may be a utilities layer comprising electronics for the first temperature control assembly. The further layer may be a utilities layer comprising electronics for the second temperature control assembly. In either case, the active thermal layer can protect the further layer.

According to a second aspect of the invention there is provided a method of manufacturing a workpiece comprising the steps of providing a tool according to the first aspect and forming a workpiece using the tool.

Figure 2A:
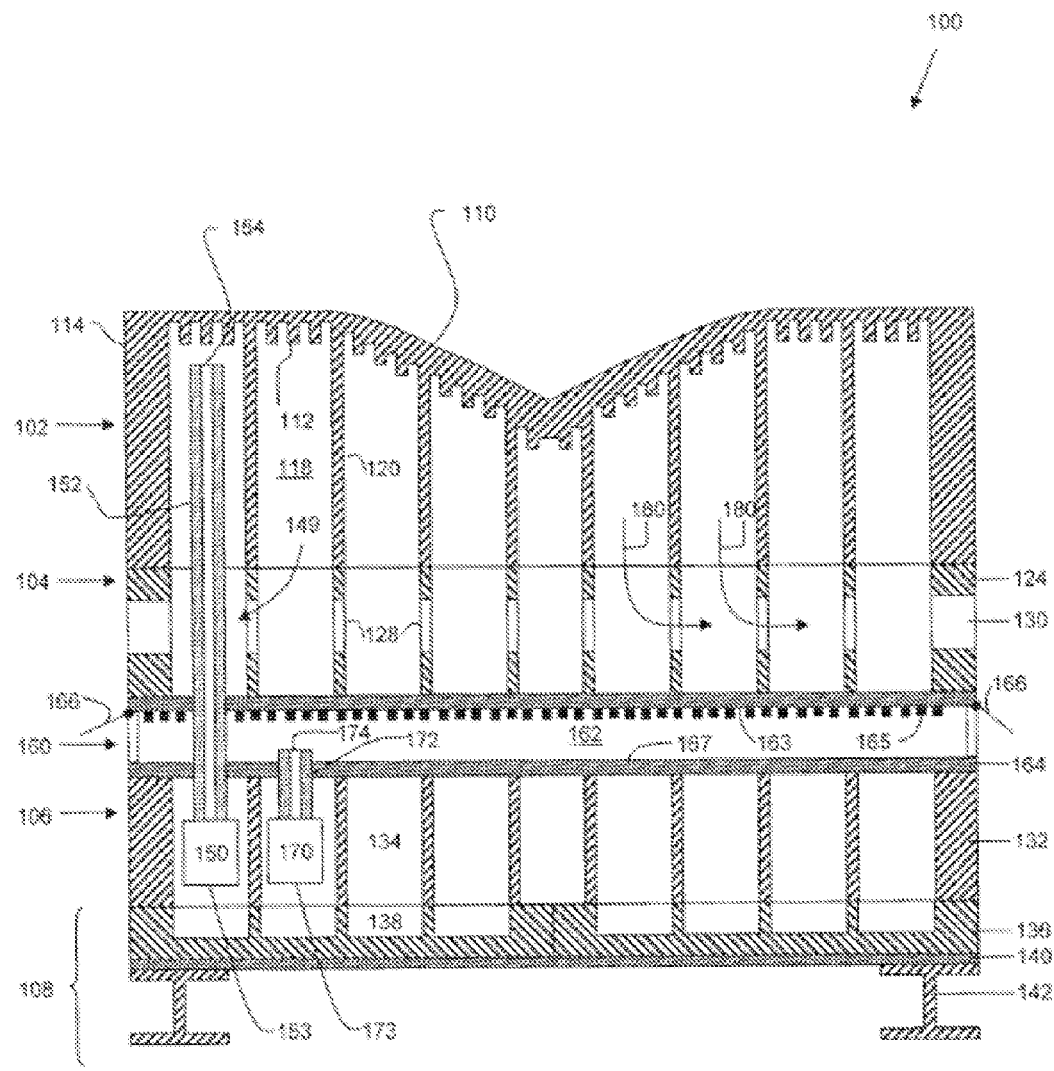
FIG. 2a is a schematic view of a first embodiment of a mould tool assembly in accordance with the present invention.

Referring to FIG. 2a, a mould tool assembly 100 comprises a first layer 102, an second layer 104, a third layer 106, a support assembly 108 and an active thermal layer 160.

The first layer 102 comprises a tool face 110. The tool face 110 defines the shape of a workpiece to be formed, and in use may be associated with an opposing tool (not shown). On the opposite side of the tool face 110, a temperature control surface 112 is defined, having ridges to increase its overall surface area for better conductive heat transfer.

The first layer 102 comprises a peripheral wall 114 so as to define an enclosed volume. The first layer 102 defines a number of discrete fluid chambers 118 which are bound by a part of the temperature control surface 112 at a first end and open at a second end 116. The chambers 118 are separated by chamber walls 120 which extend from the temperature control surface 112 to the second ends 116. As such, the first layer 102 defines a type of honeycomb structure comprising a number of discrete celllike chambers 118.

The second layer 104 is adjacent the first layer and comprises a body 124 having a number of through bores 125 defined therein. The through bores 125 are in fluid communication with each other via internal ports 128. The through bores proximate the periphery of the block 124 are in fluid communication with exhaust ports 130.

The third layer 106 comprises a body 132 having a series of through bores 134. Each of the through bores 134 contains mounting apparatus for an inline air heater 150, 170 (as will be described below).

The support assembly 108 comprises a sealing plate 136 having a plurality of blind bores 138 defined therein, a support plate 140 and a plurality of I-beams 142.

An active thermal layer 160 is provided intermediate the second and third layers and comprises a body 164 defining a single fluid chamber 162, in fluid communication with exhaust ports 166. The chamber 162 has a ceiling 163 comprising a plurality of ridges 165 provided to increase the surface area of the ceiling 163 to encourage conduction therethrough. A floor 167 of the chamber 162 has no such ridges and as such the active thermal layer is configured to provide a higher conduction of temperature across one surface than the opposite surface.

An in-line air heater assembly 149 comprises a heater 150 into which compressed air is introduced (at an inlet end 153). Heated fluid then passes through a tube 152 to an outlet 154.

As will be seen in FIG. 2, the layers are assembled with the support assembly supporting the third layer 106 in which the heaters 150 of the assemblies 149 are mounted. The active thermal layer 160 is stacked onto the third layer 106 such that the tube 152 passes through it. The second layer 104 is staked onto the third layer, again with the tube 152 passing through. Finally the first layer 102 is stacked onto the second layer 104. When assembled the outlet 154 of the tube section 152 impinges onto the temperature control surface 112 of the first layer 102 to heat or cool it (depending on whether the heater 150 is active).

The fluid then enters the chambers 118 where it flows down into the second layer 104, and is then exhausted to ports 130.

An active thermal layer heating assembly 169 is provided, comprising a heater 170 having an inlet 173 and a tube section 172 having an outlet 174. The outlet 174 of the tube section 172 ejects into the chamber 162 of the active thermal layer 160.

The active thermal layer can make the tool more agile as follows.

Figure 2B:
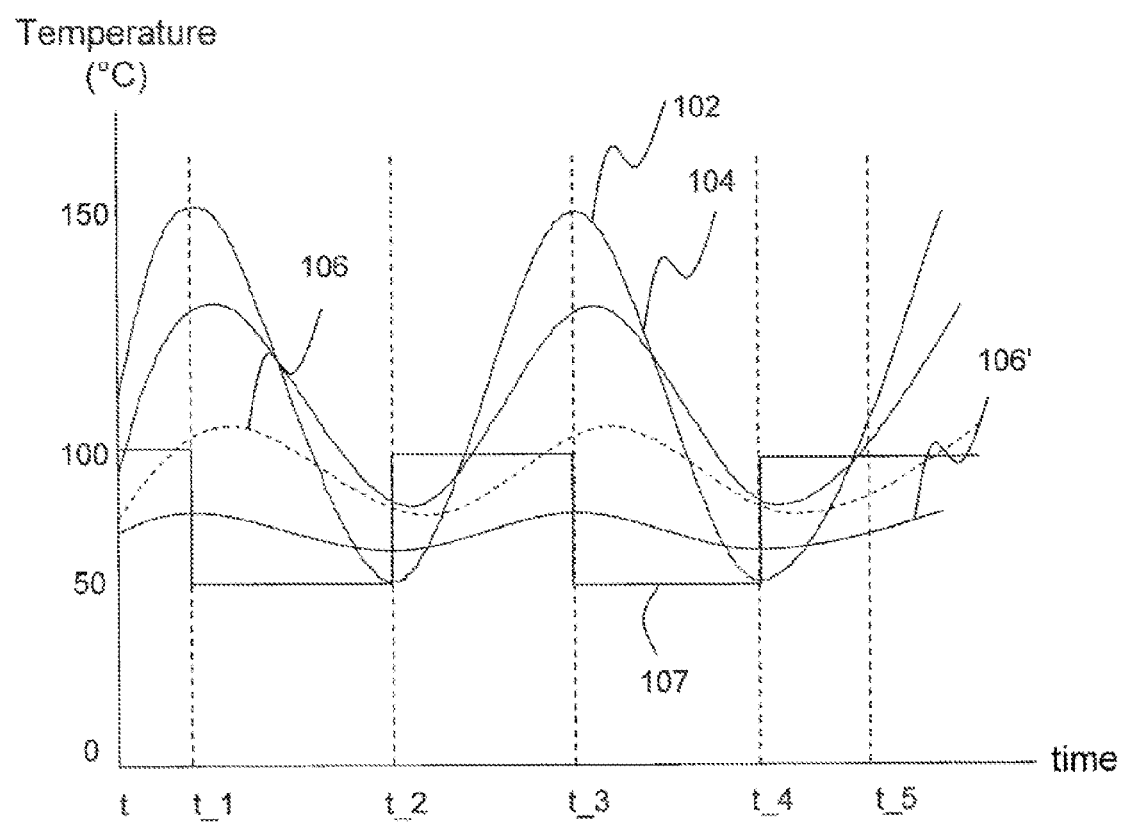

Referring to FIG. 2b, the first and second layers have respective characteristics 102, 104 as with FIG. 1. The prior art third layer profile 106 is shown, as well as the profile 106' with the active thermal layer in place. The active thermal layer has temperature characteristic 107 which is controlled by injection of hot or cold air via the assembly 169.

As can be seen, when heating the main mould tool, the thermal layer temperature can be increased to 100 degrees to provide a boost. When cooling, the active thermal layer can be cooled to provide a heat sink at 50 degrees. It will also be noted that due to the isolation of the third layer, 106' is at a generally lower temperature than 106. Therefore the utilities such as the electronics are better protected. Conduction between the active thermal layer 160 and the third layer 106 is not as good as between the active thermal layer 160 and the second layer 104 due to the increased surface area on the ceiling 163 of the active thermal layer 160.

Figure 3:
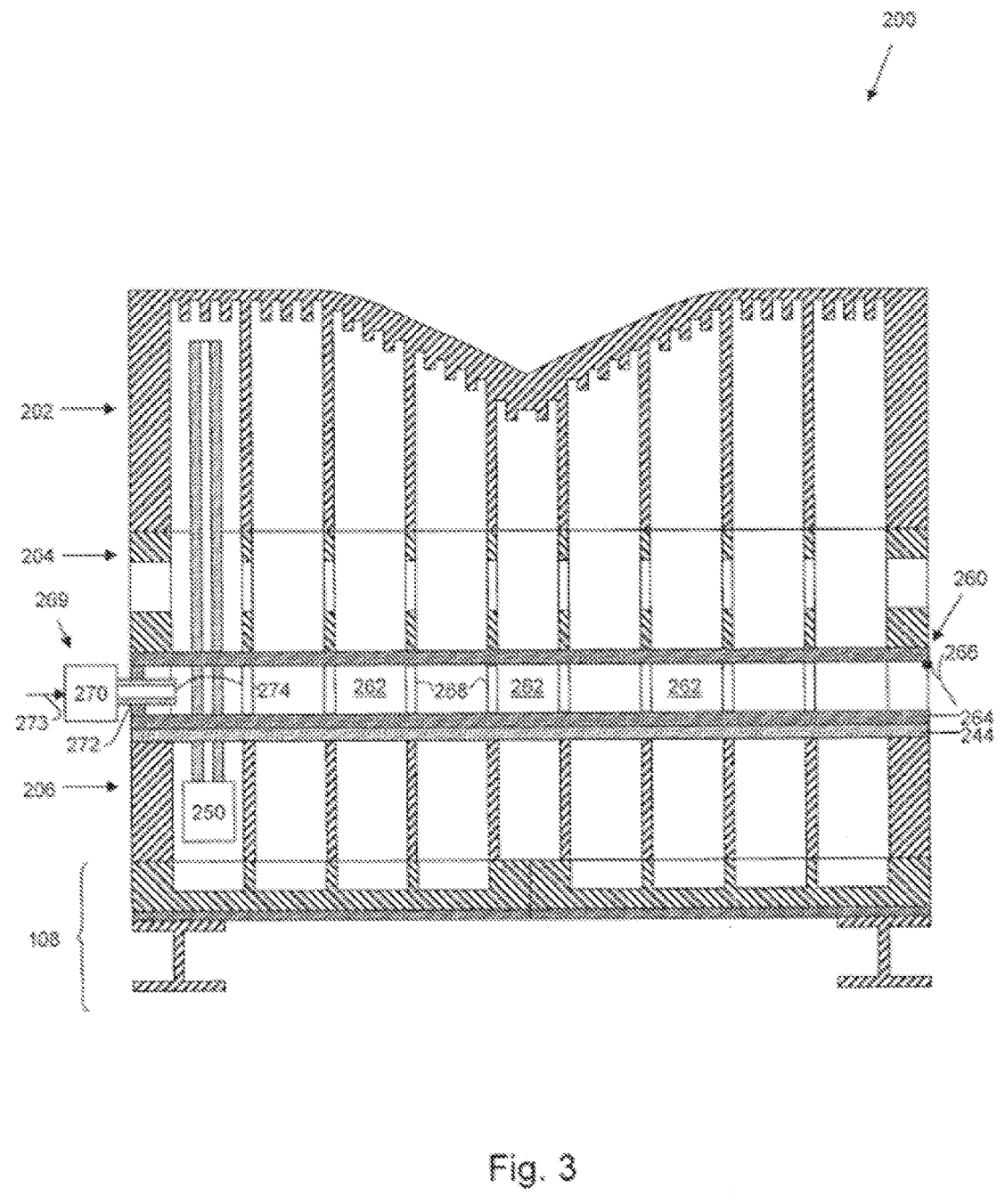

Turning to FIG. 3, a second mould tool assembly 200 similar to FIG. 2a is shown with reference numerals designating similar components 100 greater. The main differences between the tool assemblies 100 and 200 is the arrangement of the inline heater assembly 269 supplying heated fluid to the active thermal layer 260 and the division of the block 264 into multiple, interconnected chambers 262, separated by walls 268 with orifices defined therein. The inline heater 270 is arranged external to the tool 200, with tube section 272 passing through block 264, such that outlet 274 of tube section 272 ejects into the multiple interconnected chambers 262. Furthermore, disposed between the active thermal layer 260 and the third layer 206 is an insulative layer 264.

Figure 4:
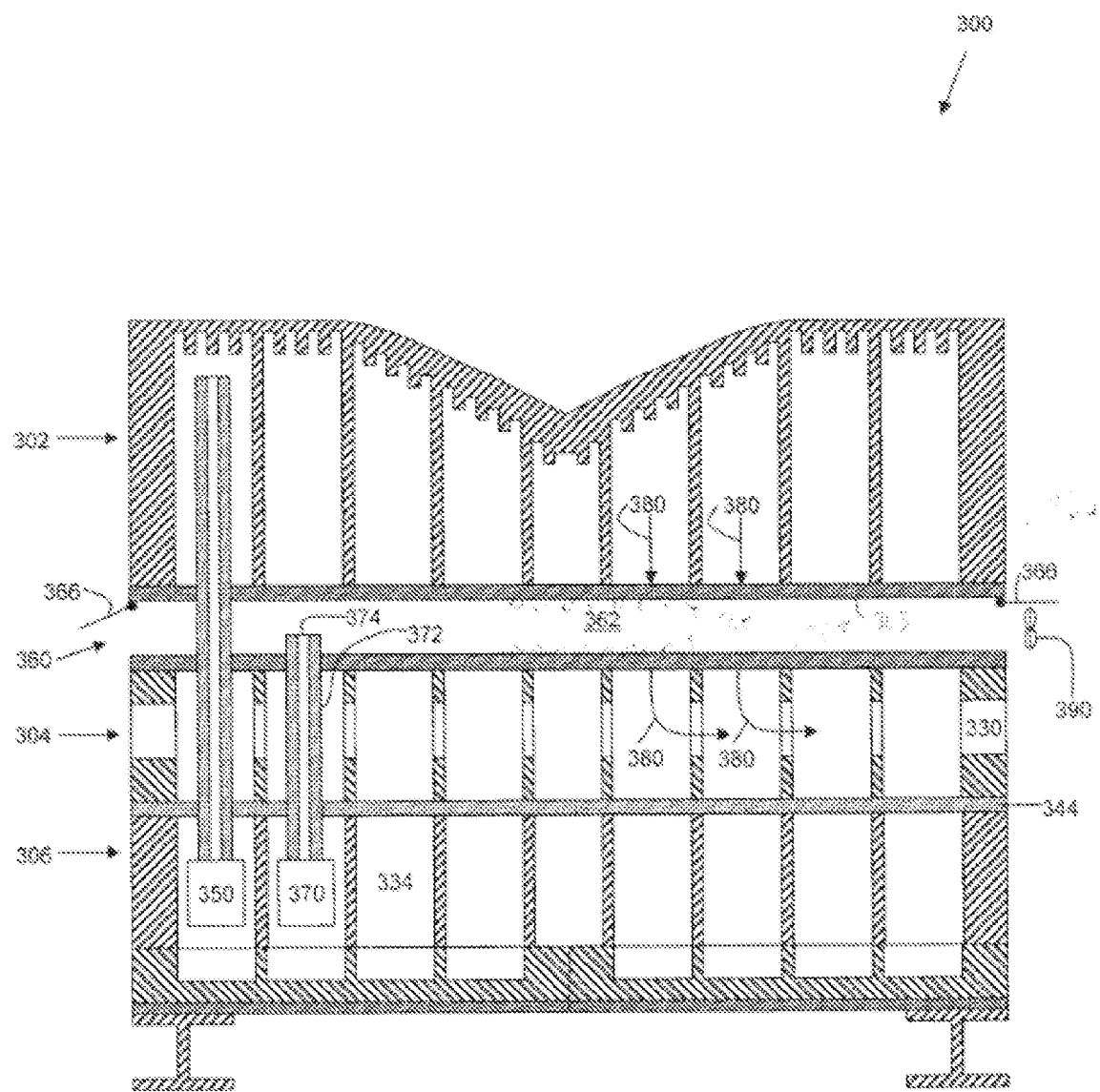
FIG. 4 is a schematic view of a third embodiment of a mould tool assembly in accordance with the present invention.

Turning to FIG. 4, a third mould tool assembly 300 to FIG. 2a is shown with reference numerals designating similar components 200 greater. Tool assembly 300 is similar to tool assembly 100 in that the inline heater 370 supplying the active thermal layer 360 is arranged with inline heater 370 mounted in the through bores 334 of the third layer 306, with outlet 374 of the tube section 372 ejecting into the single chamber 362 of the active thermal layer 360. However, in mould tool 300, active thermal layer 360 is disposed between the first layer 302 and the second layer 304. As such, tube section 372 must traverse the third layer to second layer boundary. Gasket 344 is provided between the second layer 304 and the third layer 306.

Furthermore, the single fluid chamber 362 of active thermal layer 360 has a localised central region of ceiling 363 and floor 367 comprising a plurality of ridges 365 provided to increase the surface area of the central region to encourage conduction therethrough. The outer region of the ceiling 363 and floor 367 of the chamber 362 has no such ridges and as such the active thermal layer is configured to provide a higher conduction of temperature in its centre region compared to its outer region.

The passage of fluid from the first layer 302 to the second layer 304 is enabled by a series of channels disposed through the active thermal layer 360, as indicated by arrows 380 (but not shown).

Additionally, mould tool 300 has a fan 390 arranged to blow air across the active thermal layer 360 entering and exiting through ports 366.

Figure 5:
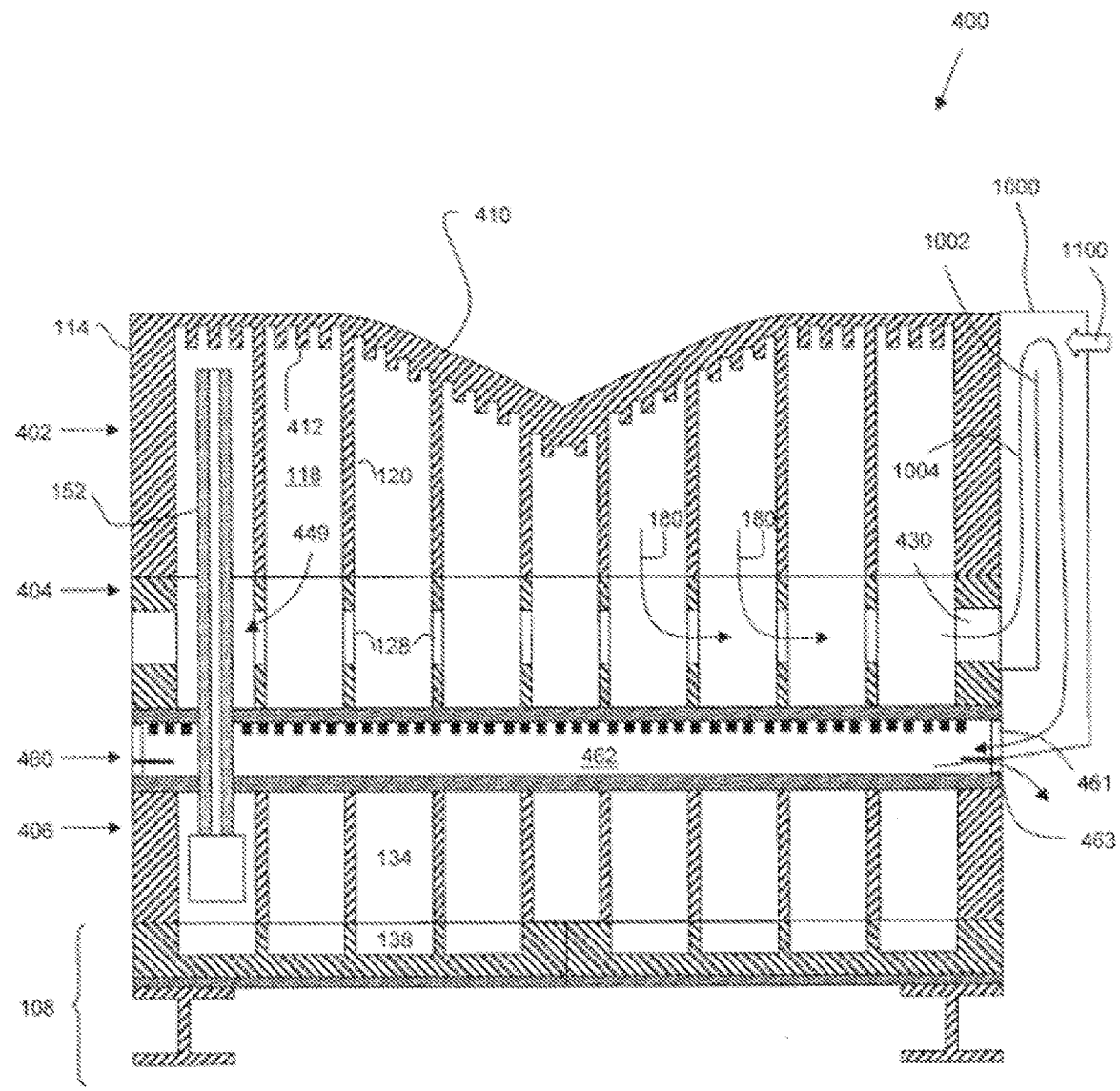
FIG. 5 is a schematic view of a fourth embodiment of a mould tool assembly in accordance with the present invention.

Turning to FIG. 5, a mould tool assembly 400 is shown, being similar to the mould tool assembly 100 with reference numerals of similar components 300 greater. Like the tool assembly 100, the tool assembly 400 has a first layer 402, second (exhaust) layer 404 and a third (utilities) layer 406. A temperature control assembly 449 directs hot or cold air to the back face 412 of the first layer 402, opposite the mould face 410.

An active thermal layer 460 comprising a fluid chamber 462 is provided between the second and third layers 404, 406. The active thermal layer 460 has an inlet 461 and an outlet 463.

A peripheral fluid chamber 1000 is provided in fluid communication with both (i) an outlet 430 of the second layer to receive exhaust air, and (ii) the inlet 461 of the active thermal layer 460. The peripheral fluid chamber 1000 defines a channel extending so as to direct airflow 1004 from the exhaust layer 404, to the periphery of the first part 402, before returning past the exhaust layer 404 to the active thermal layer.

The chamber 1000 comprises a baffle 1002 to direct the fluid flow in this manner. The chamber 100 also extends partially or wholly around the periphery of the first part 402 to reduce losses to the surrounding environment (on the basis that the exhaust flow is hotter than ambient air).

Once the flow 1004 has entered the active thermal layer 462, it can exit at the outlet 463.

A separate temperature control assembly 1100 is shown schematically, comprising an inline air heater which can be selectively activated an deactivated to heat or cool the air in the chamber 1000. This can be useful to reduce still further the difference in temperature between the first layer 402 and the surroundings. The assembly 1100 can be used for heating (with the associated heater activated) or cooling (with the associated heater deactivated) per the assembly 449.

Variations of the above embodiments fall within the scope of the present invention.

It will be appreciated that although the invention has been described in relation to a single tool face in many applications a tool with two tool faces will be used and that an upper tool face according to this invention may also be used in combination with a lower tool face to provide an active thermal layer for both sides of the tool.

Exhaust flow from the second layer 404 may be directed to the active thermal layer 462 without the peripheral chamber 1000 (a simple conduit may be used). This will offer the advantages of using pre-heated air in the active thermal layer. Additional temperature control assemblies may be provided in the active thermal layer.

The active thermal layer may be a pressurised system operated at different pressures according to the necessary heating regime. By operating the system at a higher pressure than atmospheric pressure, an additional control vector is available for the management of the tool.

Active thermal layers may be positioned between both the first and second, and second and third layers.

The invention claimed is:

1. A mould tool assembly comprising:
   a mould layer comprising a mould face and a temperature control surface that is disposed opposite the mould face;
   a utilities layer configured to support the mould layer in use;
   a first temperature control assembly comprising a heater and a fluid conduit extending from the utilities layer to the mould layer and configured to direct heating and/or cooling fluid to the temperature control surface to heat and/or cool the mould layer; and
   an active thermal layer disposed between the mould layer and the utilities layer, wherein the active thermal layer comprises a fluid chamber configured to be heated and/or cooled independently of the mould layer, wherein the fluid conduit extends through the active thermal layer.

2. A mould tool assembly according to claim 1, comprising an exhaust layer, the exhaust layer being positioned between the mould layer and the utilities layer.

3. A mould tool assembly according to claim 2, wherein the active thermal layer is positioned between the exhaust layer and the utilities layer.

4. A mould tool assembly according to claim 2, wherein the active thermal layer is positioned between the exhaust layer and the mould layer.

5. A mould tool assembly according to claim 2, wherein the exhaust layer is an exhaust layer for the mould layer heating flow.

6. A mould tool assembly according to claim 5, further comprising a flow conduit from an outlet of the exhaust layer to the active thermal layer.

7. A mould tool assembly according to claim 6, wherein the flow conduit is configured to provide flow past the periphery of the mould layer to reduce a temperature difference between the mould layer and a local environment.

8. A mould tool assembly according to claim 1, further comprising a second temperature control assembly configured to selectively heat and/or cool the active thermal layer.

9. A mould tool assembly according to claim 8, wherein the second temperature control assembly comprises a fluid conduit for connection to a pressurised source of fluid, and a heater configured to be selectively switched on and off to provide a heating flow or cooling flow of the fluid, respectively.

10. A mould tool assembly according to claim 9, wherein the active thermal layer defines a further temperature control surface on a side of the fluid chamber furthest from the further layer.

11. A mould tool assembly according to claim 10, wherein a fluid outlet of the fluid conduit of the second temperature control assembly is directed towards the second temperature control surface.

12. A mould tool assembly according to claim 9, defining a Z axis generally perpendicular to the mould layer, wherein the second temperature control assembly is arranged to direct flow perpendicular to the Z axis.

13. A mould tool assembly according to claim 12, wherein the second temperature control assembly is at least partly positioned exterior the tool.

14. A mould tool assembly according claim 8, wherein the utilities layer contains electronics for the second temperature control assembly.

15. A mould tool assembly according to claim 1, wherein the fluid chamber comprises a plurality of interconnected chambers.

16. A mould tool assembly according to claim 1, wherein the fluid chamber of the active layer has a first wall adjacent the mould layer, and a second wall adjacent the utilities layer and at least a region of one of the first or second walls comprises features increasing the surface area of the first or second wall over the other of the first or second wall.

17. A mould tool assembly according to claim 1, further comprising a sensor configured to detect a temperature of the fluid chamber.

18. A mould tool assembly according to claim 17, further comprising a control system configured to maintain the temperature of the active thermal layer at a predetermined set point.

19. A mould tool assembly according to claim 1, wherein the utilities layer contains electronics for the first temperature control assembly.

20. A method of manufacturing a workpiece comprising the steps of:
    providing a mould tool assembly according to claim 1; and,
    forming a workpiece with the mould tool.

* * * * *